United States Patent [19]

Shekleton et al.

[11] Patent Number: 5,024,058

[45] Date of Patent: Jun. 18, 1991

[54] HOT GAS GENERATOR

[75] Inventors: Jack R. Shekleton, San Diego; Robert W. Smith, Lakeside, both of Calif.

[73] Assignee: Sundstrand Corporation, Rockford, Ill.

[21] Appl. No.: 447,654

[22] Filed: Dec. 8, 1989

[51] Int. Cl.[5] .......... F02C 3/14

[52] U.S. Cl. .......... 60/752; 60/39.32

[58] Field of Search .......... 60/753, 748, 760, 752, 60/39.32; 120/144, 148, 151

[56] References Cited

U.S. PATENT DOCUMENTS

| | | | |
|---|---|---|---|
| 3,982,392 | 9/1976 | Crow . | |
| 4,030,875 | 6/1977 | Grondahl et al. . | |
| 4,201,047 | 5/1980 | Warren et al. . | |
| 4,288,980 | 9/1981 | Ernst . | |
| 4,441,324 | 4/1984 | Abe et al. . | |
| 4,474,014 | 10/1984 | Markowski . | |
| 4,567,730 | 2/1986 | Scott | 60/757 |
| 4,614,082 | 9/1986 | Sterman et al. | 60/39.32 |
| 4,655,044 | 4/1987 | Dierberger et al. | 60/753 |
| 4,709,643 | 12/1987 | Moreno et al. . | |

*Primary Examiner*—Louis J. Casaregola
*Assistant Examiner*—Timothy S. Thorpe
*Attorney, Agent, or Firm*—Wood, Phillips, Mason, Recktenwald & Vansanten

[57] ABSTRACT

Improved performance in a hot gas generator 10 is achieved by providing a liner 21 positioned within a wall 14 of a vessel 12 so as to be disposed about a combustion chamber 20 therein. The liner 21 is positioned relative to the wall 14 to define a relatively uniform gap 26 therebetween and is adapted to thermally expand under heat for controlling heat transfer from the combustion chamber 20 through the liner 21 and the wall 14 entirely throughout a preselected temperature range. With this arrangement, the gap 26 is selected to accommodate thermal expansion of the liner 21 in a manner producing relatively little stress thereon.

21 Claims, 3 Drawing Sheets

HOT GAS GENERATOR

FIELD OF THE INVENTION

The present invention relates to a generator for producing hot gases as, for example, might be employed to drive a turbine wheel.

BACKGROUND OF THE INVENTION

Hot gas generators have long been utilized for producing hot gas under pressure to operate engines of various types as well as for other purposes. In such hot gas generators, a carbonacious fuel is combusted with an oxidant to produce hot gases of combustion, and additional fuel may typically be introduced into the hot gases of combustion to be vaporized, or partly decomposed, or both. By so doing, the volume of hot gas can be increased while bringing the temperature of the combustion gas down to a temperature incapable of causing damage to the system in which the generator is used.

One difficulty in the operation and use of such hot gas generators is carbon buildup which results when the fuel is not completely oxidized and elemental carbon is formed within the combustion chamber of the generator. It is important to keep the internal walls of the combustion chamber hot so that the diffusion of carbon to the walls and adherence of carbon on the walls is minimized. Also, carbon buildup can be avoided by providing an excess of oxidant within the combustion chamber but this necessarily results in excessive consumption of oxidant during operation of the hot gas generator.

As a result, there is ordinarily a plentiful supply of liquid fuel in most cases. It is thus conventional practice to run a hot gas generator on the rich side so that all available oxidant is consumed during combustion to thereby minimize oxidant consumption. However, by so doing, the potential for carbon buildup is increased.

As pointed out in Parrin U.S. Pat. No. 1,828,784, issued Oct. 27, 1931, it is also desirable to cool the combustion chamber to prevent damage thereto by excessive heat from combustion occurring therein. Advantageously, this is accomplished by cooling the combustion chamber with fuel, but the fuel may get overly hot causing gumming up leading to rapid failure and, furthermore, the fuel starts to boil which makes fuel injector design difficult and causes serious control system instabilities. At lower power settings, this fuel overheating is particularly troublesome because the low pressure in the combustion chamber results in fuel boiling at lower temperatures.

From the foregoing, it should be clear that there are two fundamental considerations. First, the internal walls of the combustion chamber must be at a maximum temperature. Second, the heat flux through the internal walls must be minimal. In this manner, carbon buildup can be avoided while providing the necessary cooling.

As will be appreciated, carbon buildup is undesirable because it may interfere with heat transfer, but another problem resulting from carbon buildup is much more serious. Specifically, hot gas generators are frequently used to produce hot gases for driving turbine wheels. As carbon builds up, particles thereof typically break free and then flow with the hot gas through the turbine wheel. Unfortunately, particulate carbon erodes the turbine nozzles and the turbine wheels. Furthermore, carbon deposits can build up on the surfaces of the turbine nozzles and restrict the flow to cause performance losses.

The hot gas generators disclosed in commonly owned and co-pending applications Ser. No. 123,303, filed Nov. 20, 1987; Ser. No. 272,409, filed Nov. 17, 1988; and Ser. No. 324,806, filed Mar. 17, 1989 avoid many of these difficulties. Thus, they are recognized as highly advantageous. Nonetheless, improvements in terms of precisely controlling heat transfer from the combustion chamber through a liner and a wall while providing a simplified construction in a hot gas generator is also highly desirable.

As previously mentioned, it is a principal requirement to keep the combustor walls adjacent the flame hot so as to minimize carbon deposition. At the same time, heat loss from the flame must be kept to a minimum to avoid chilling of the combustor reaction and consequent performance loss. Furthermore, cooling air must pick up sufficient heat from the flame so that fuel flowing through the fuel injector does not freeze At the same time, it would be advantageous to preheat the cooling air prior to combustion to assure fast evaporation and early ignition of the fuel/air mixture at super cold temperature.

The present invention is directed to overcoming one or more of the foregoing problems and providing one or more of the suqgested improvements.

SUMMARY OF THE INVENTION

It is the principal object of the invention to provide a new and improved hot gas generator. More specifically, it is an object of the invention to provide a hot gas generator that is constructed with a unique liner or shield positioned therewithin and about a combustion chamber in a manner controlling heat transfer from the combustion chamber through the liner and the wall of the generator. It is also an object of the invention to provide heat transfer controlling surface means associated with at least one of the liner and wall.

An exemplary embodiment of the invention achieves the foregoing in a hot gas generator comprising a vessel having a wall defining narrow, spaced apart inlet and outlet ends interconnected by a relatively wide combustion chamber. The generator includes a liner positioned within the wall so as to be disposed substantially entirely about the combustion chamber. The liner is positioned relative to the wall to define means for controlling heat transfer from the combustion chamber through the liner and the wall in a manner limiting stress on the liner through a preselected temperature range. The generator also includes an oxidant inlet port at the inlet end of the wall and a fuel discharge port for directing fuel into the combustion chamber. With this arrangement, the liner may advantageously comprise a generally spherically shaped liner formed of a material adapted to thermally expand under heat in a manner producing relatively little stress thereon.

According to one aspect of the invention, the portion of the wall defining the combustion chamber includes a generally spherical recess. This recess is advantageously sized to loosely receive a pair of hemispherically shaped liners so as to accommodate thermal radially outward expansion thereof. Further, the vessel may typically have both interior and exterior walls in closely spaced relation to define an oxidant flow path therebetween.

With this arrangement, oxidant may flow between the interior and exterior walls from adjacent the outlet end to the oxidant inlet port at the inlet end of the interior wall. This will provide cooling of the interior wall outwardly of the liners while allowing the introduction of oxidant upstream of the fuel discharge port. Later, the oxidant and fuel will be mixed in the combustion chamber where it will then be ignited in order to produce the hot gases therein.

In a highly preferred embodiment, the heat transfer controlling means includes a relatively uniform gap between the wall and the hemispherically shaped liners. This makes it possible to control heat transfer from the combustion chamber through the liners and the wall entirely throughout the preselected temperature range particularly when the liners are adapted to thermally expand under heat to close the gap at a preselected temperature. In this connection, the gap is advantageously selected to accommodate thermal radially outward expansion of the hemispherically shaped liners in a manner producing relatively little stress thereon.

Preferably, the hot gas generator also includes surface means associated with at least one of the liners and the wall for controlling heat transfer from the combustion chamber through the liners and the wall entirely throughout the preselected temperature range. This may by way of example take the form of a plurality of indentations in a surface of either the liners, or the wall, or both whereby heat transfer is controlled by impeding heat from the combustion chamber reaching the wall. Further the heat transfer controlling surface means may take the form of a plurality of trip strips secured to the interior wall of the vessel in the oxidant flow path.

Still additional details of the invention may include cooling means associated with the interior wall. The cooling means may advantageously comprise a fuel supply tube on the side thereof opposite the combustion chamber. With this arrangement, the fuel supply tube may extend about and be joined to the interior wall in coil fashion.

In a highly preferred embodiment, the hemispherically shaped liners are formed of a metal having a coating of a ceramic material defining an inner surface thereof. It will be appreciated that the inner surface of the hemispherically shaped liners faces the combustion chamber. Advantageously, the hemispherically shaped liners are sufficiently thin-walled so as to be flexible and rapidly heated and cooled during extreme heat transfer conditions.

Additionally, the vessel may have a longitudinal axis extending from the inlet end through the combustion chamber to the outlet end thereof. The oxidant inlet port is preferably disposed so as to be concentric with the longitudinal axis of the vessel at the inlet end of the interior wall and the fuel discharge port is similarly disposed so as to be concentric with the longitudinal axis of the vessel at the combustion chamber. Further a second fuel discharge port may be provided in which case one port is disposed adjacent the inlet end and the other port is disposed within the combustion chamber upstream of the outlet end to define a dual fuel injector.

Other objects, advantages and features of the present invention will become apparent from a consideration of the following specification taken in conjunction with the accompanying drawings.

DETAILED DESCRIPTION OF THE PREFERRED EMBODIMENTS

Figure 1:
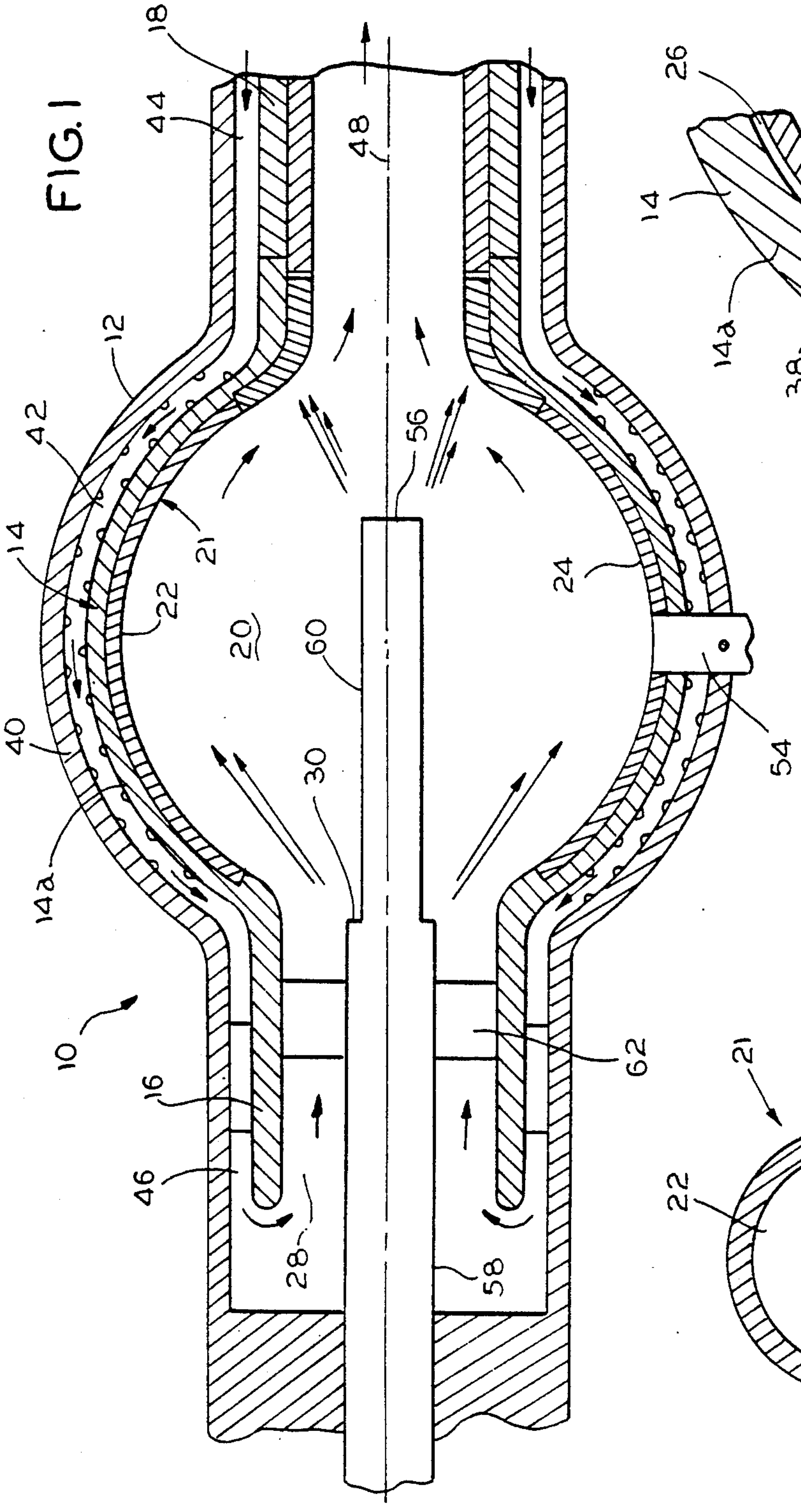
FIG. 1 is a partially schematic, partially sectional view of a hot gas generator in accordance with the present invention.
Figure 2:
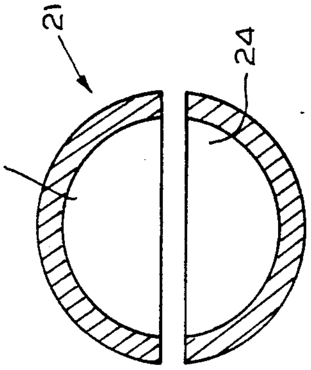
FIG. 2 is a cross sectional view of a pair of hemispherically shaped liners or shields for the hot gas generator illustrated in FIG. 1.

Referring to the drawings, and first to FIG. 1, the reference numeral 10 designates generally a hot gas generator comprising a vessel 12 having an interior wall 14 defining narrow, spaced apart inlet and outlet ends 16 and 18 interconnected by a relatively wide combustion chamber 20. The hot gas generator 10 includes a liner generally designated 21 which usually is generally spherically shaped and made up of a pair of hemispherically shaped liners or shields 22 and 24 positioned within the interior wall 14 so as to be disposed substantially entirely about the combustion chamber 20. The generally spherically shaped liner 21 is positioned relative to the interior wall 14 to define means for controlling heat transfer from the combustion chamber 20 through the liner 21 and the interior wall 14 in the form of a relatively uniform gap 26 (see FIG. 3). The relatively uniform gap 26 is adapted to limit stress on the generally spherically shaped liner 21 through a preselected temperature range by accommodating thermal expansion of the liner in a controlled manner. The hot gas generator 10 also includes an oxidant inlet port as at 28 at the inlet end 16 of the interior wall 14 and a fuel discharge port as at 30 for directing fuel into the combustion chamber 20. Preferably, the material of the generally spherically shaped liner 21 is a metal as at 32 which can suitably be coated with a ceramic material as at 34 wherein the coating of ceramic material as at 34 defines an inner surface of the generally spherically shaped liner 21 facing the generally spherically shaped combustion chamber 20 (see FIG. 4).

As previously mentioned, the generally spherically shaped liner 21 preferably includes a pair of hemispherically shaped liners or shields 22 and 24. These hemispherically shaped liners or shields 22 and 24 normally have a gap as at 36 (see FIG. 3) and an interface therebetween, i.e , between each of the shields and an adjacent surface, and are formed of a material adapted to thermally expand under heat to minimize the gap 36 at the interface in a manner producing relatively little stress thereon. As a result, the hemispherically shaped liners or shields 22 and 24 are also adapted to thermally expand under heat to close the gap as at 26.

Figure 3:
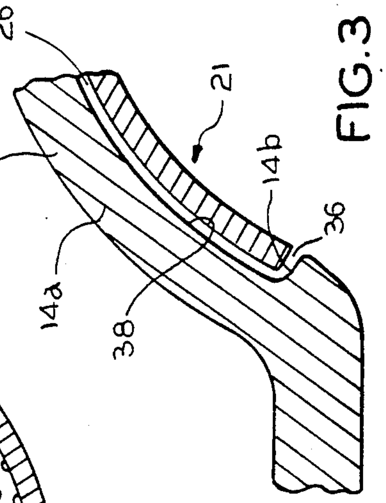
FIG. 3 is a longitudinal cross sectional view illustrating the relationship between the hemispherically shaped liners or shields and an interior wall of a vessel defining the hot gas generator illustrated in FIG. 1.
Figure 4:
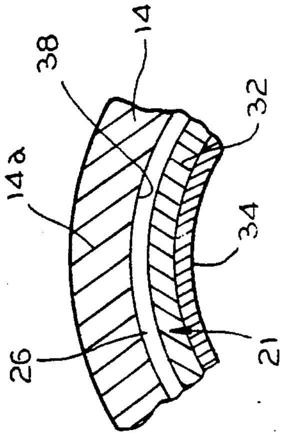
FIG. 4 is an enlarged cross sectional view of the hemispherical liner or shield and interior wall illustrating a composite material for the liner or shield.

As will be appreciated by referring to FIGS. 1 and 3, the portion 14a of the interior wall 14 defining the combustion chamber 20 includes a generally spherical recess as at 38 which is sized so as to loosely receive the hemispherically shaped liners or shields 22 and 24 (see, in particular, FIG. 3). Thus, the generally spherical recess as at 38 accommodates thermal radially outward expansion of the hemispherically shaped liners or shields 22 and 24 inasmuch as the relatively uniform gap as at 26 between the interior wall 14 and the liners or shields 22 and 24 may thereby control heat transfer from the combustion chamber 20 through the liners or shields 22 and 24 and the interior wall 14 entirely throughout the preselected temperature range. With this arrangement, the generally spherical recess 38 can readily accommodate thermal expansion both radially outwardly toward the interior wall portion 14a and circumferentially toward the ends 14b of the interior wall portion 14a defining the generally spherical recess 38 to close the gap as at 26 and to minimize the gap as at 36.

In a preferred embodiment, the generally spherically shaped liner 21 is adapted to thermally expand under heat to close the gap as at 26 at a preselected temperature. Thus, the gap as at 26 is purposely selected to accommodate radially outward expansion of the generally spherically shaped liner 21 as determined from normal operating temperature parameters in a manner producing relatively little stress thereon. Similarly, the gap as at 36 is purposely selected to accommodate thermal circumferential expansion of the generally spherically shaped liner 21 in a manner producing relatively little stress thereon.

For this purpose, the hemispherically shaped liners 22 and 24 are preferably sufficiently thin-walled so as to be flexible and thus rapidly heated and rapidly cooled during the extreme heat transfer conditions that are experienced under different operating conditions. The rapid heating of the hemispherically shaped liners 22 and 24 rapidly diminishes any chilling and resulting flame inefficiency from external conditions so as to rapidly achieve the completion of the combustion reaction in a highly desirable manner. As a result, any waste of oxidant and fuel consequent to inefficiency is largely minimized since the thin-walled hemispherically shaped liners or shields 22 and 24 are so responsive to temperature increases in the combustion chamber 20.

At the same time, the rapid heating of the hemispherically shaped liners or shields 22 and 24 minimizes the potential for carbon buildup due to the very favorable heat transfer characteristics whereby the hemispherically shaped liners or shield are so responsive to temperature. It will also be appreciated that, as the hemispherically shaped liners or shields 22 and 24 heat up, they expand thus allowing for reasonable manufacturing tolerances since, by properly choosing an initial air gap as at 26, firm thermal contact between the hemispherically shaped liners or shields 22 and 24 and the interior wall 14 can be assured at a point prior to attainment of excessive wall temperatures. Once this firm thermal contact is achieved, the hemispherically shaped liners or shields 22 and 24 can be cooled by virtue of the large increase in heat flux from the hemispherically shaped liners or shields 22 and 24 to the interior wall 14.

As shown in FIG. 1, the vessel 12 also includes an exterior wall 40 in closely spaced relation to the interior wall 14 to define an oxidant flow path 42 therebetween. Thus, oxidant can flow from a source into the oxidant flow path 42 as at 44 completely about the region of the combustion chamber 20 and to the end 46 of the oxidant flow path 42 where it can reverse direction so as to pass through the oxidant inlet port 28 at the inlet end 16 of the interior wall 14. Thereafter, oxidant can flow into the combustion chamber 20 where it is mixed with fuel from the fuel discharge port 30 to be combusted therein.

Still referring to FIG. 1, it will be appreciated that the vessel 12 has a longitudinal axis 48 which extends from the inlet end 16, completely through the combustion chamber 20, and through the outlet end 18 of the hot gas generator 10. The oxidant inlet port 28 is disposed so as to be concentric with the longitudinal axis 48 of the vessel 12 at the inlet end 16 whereas the fuel discharge port 30 is also disposed so as to be concentric with the longitudinal axis 48 of the vessel 12 but at a point downstream of the oxidant inlet port 28 at the combustion chamber 20. As a result, oxidant floWs generally axially along the oxidant flow path 42 from the outlet end 18 to the inlet end 16 and then entirely reverses direction to flow generally axially from the inlet end 16 toward the outlet end 18.

Figure 5:
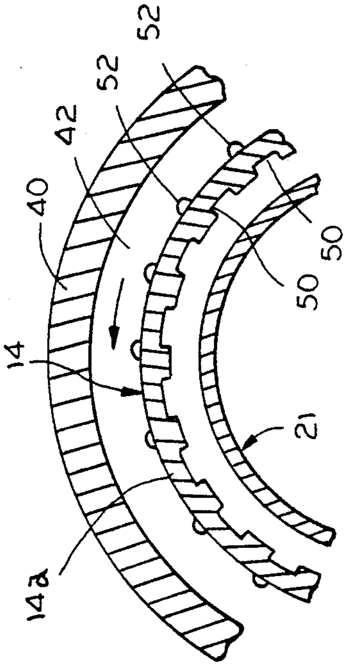
FIG. 5 is an enlarged cross sectional view of the hemispherical liner or shield and interior and exterior walls illustrating heat transfer control in accordance with the present invention.

As best shown in FIG. 5, the hot gas generator 10 preferably includes at least one form of surface means associated with at least one of the hemispherically shaped liners 22 and 24 and interior wall 14 for controlling heat transfer. Specifically, the heat transfer controlling surface means may include either a plurality of indentations 50 in a confronting surface of either or both of the hemispherically shaped liners 22 and 24 and interior wall 14 for controlling heat transfer by impeding heat from the combustion chamber 20 reaching the interior wall and/or it may include a plurality of trip strips 52 disposed in the oxidant flow path 42 wherein the trip strips 52 are secured to the interior wall 14 of the vessel 12. In this manner a considerable degree of control over heat transfer from the combustion chamber 20 through the generally spherically shaped liner 21 and through the interior wall 14 can be achieved.

As will be appreciated by those skilled in the art, the size and spacing of the trip strips 52 can be precisely tailored by simple tests. This makes it possible to achieve close and uniform liner temperature control by varying heat transfer characteristics. Likewise, the heat transfer characteristics from the combustion chamber 20 through the liner 21 and through the interior wall 14 can easily be modified and adjusted.

In this connection, the modification and adjustment of the heat transfer characteristics of the generally spherically shaped liner 21 is achieved by means of the indentations 50. These indentations 50 provide gaps even when firm thermal contact has been achieved between the hemispherically shaped liners or shields 22 and 24 and the interior wall 14 which means that heat transfer is impeded by the indentations such that the size and positioning thereof permits tailoring of the temperature of the liners or shields 22 and 24. As will be appreciated, the indentations 50 can be provided in either or both of the confronting surfaces of the hemispherically shaped liners or shields 22 and 24 and interior wall 14 by means such as machining, chemical etching, embossment and the like.

With the arrangement illustrated in FIG. 1, oxidant is available to cool the interior wall 14 as it flows along the oxidant flow path 42. It is then available in the combustion chamber 20 to be mixed with fuel from the fuel discharge port 30 and then combusted by means of an igniter 54 in the combustion chamber 20. Once the fuel and oxidant have been combusted, the hot gases can pass through the outlet end 18 to, e.g., drive a turbine wheel.

If desired in a particular application, the hemispherically shaped liners or shields 22 and 24 can be formed solely of a metal having the desired thermal expansion characteristics. It may be advantageous in many applications, however, for the liners or shields 22 and 24 to comprise a composite material having the ceramic coating 34 as an inner surface facing the combustion chamber 20 which will remain quite hot to thereby minimize carbon buildup while also minimizing heat flux through the interior wall 14. By utilizing liners or shields 22 and 24 separate from the interior supporting or structural wall 14, it is possible to accomplish these objectives with the additional features set forth in detail hereinabove.

Also, it should be noted that the ceramic coating 34 can be successfully utilized because the liners or shields 22 and 24 comprise relatively thin inwardly facing walls. Thus, while it is known that such coatings normally tend to crack or spall off when applied to massive structural supporting walls, the fact that the liners or shields 22 and 24 are thin, non-structural members essentially free of stress minimizes such problems. Moreover, without the need for concern over stress, a wider choice of materials is available to minimize such crack and spall problems since the only concern is oxidation resistance.

Preferably, the hot gas generator 10 includes a second fuel discharge port 56 in which case the first of the fuel discharge ports 30 is disposed at the end of the combustion chamber 20 nearest the inlet end 16 of the vessel 12. It will be appreciated that the other of the fuel discharge ports 56 will advantageously be disposed within and near the end of the combustion chamber 20 nearest the outlet end 18 of the vessel 12. With this arrangement, the fuel discharge ports 30 and 56 define what may suitably be called a dual fuel injector defined by a pair of concentric fuel supply tubes 58 and 60 located on the longitudinal axis 48.

As shown in FIG. 1, one of the fuel discharge ports 30 is disposed in the outermost one of the tubes 58 and the other of the fuel discharge ports 56 is disposed in the innermost one of the tubes 60. It will be seen that the outermost one of the fuel supply tubes 58 is adapted to inject fuel into the combustion chamber 20 from the inlet side thereof and the innermost one of the fuel supply tubes 60 is adapted to inject fuel into the combustion chamber 20 in the vicinity of the outlet side thereof. In addition, an oxidant swirler 62 may be provided upstream of the fuel discharge ports 30 and 56 to control oxidant swirl as oxidant enters the combustion chamber 20.

Figure 6B:
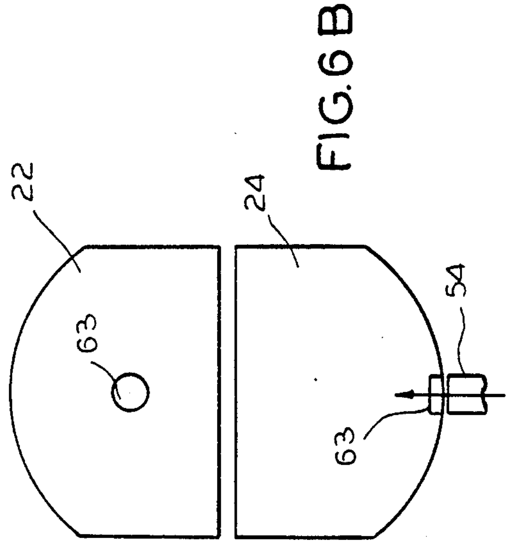
FIG. 6*b* is a cross sectional view illustrating the technique for locating the hemispherically shaped liners or shields in the hot gas generator.
Figure 6A:
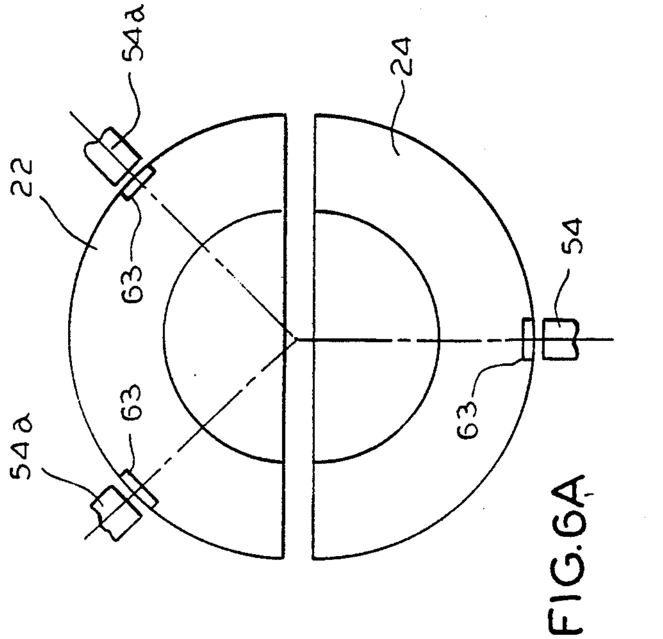
FIG. 6*a* is a perspective view illustrating the technique for locating the hemispherically shaped liners or shields in the hot gas generator.

Referring to FIGS. 6a and 6b, the liners or shields 22 and 24 may suitably be located by means of the igniter 54 and radial support pins 54a. For this purpose, there are a plurality of holes 63 which are sized such that there is a relatively narrow circumferential gap between the holes 63 and the igniter 54 and radial support pins 54a so that there will not be any significant leakage of oxidant from the oxidant flow path 42 into the combustion chamber 20. At the same time, the relatively narrow gaps will accommodate free radial expansion of the liners or shields 22 and 24.

In a preferred embodiment, the liners or shields 22 and 24 will be supported at three radial locations. It is advantageous for these three radial locations to be equispaced, although it is also possible to use four or more radial supports preferably, but not necessarily, equispaced. However, for optimal results, the center line of all of the igniter 54 and pins 54a will intersect at one point on the center line of the combustion chamber 20, i.e., on the longitudinal axis 48 of the vessel 12.

Figure 7:
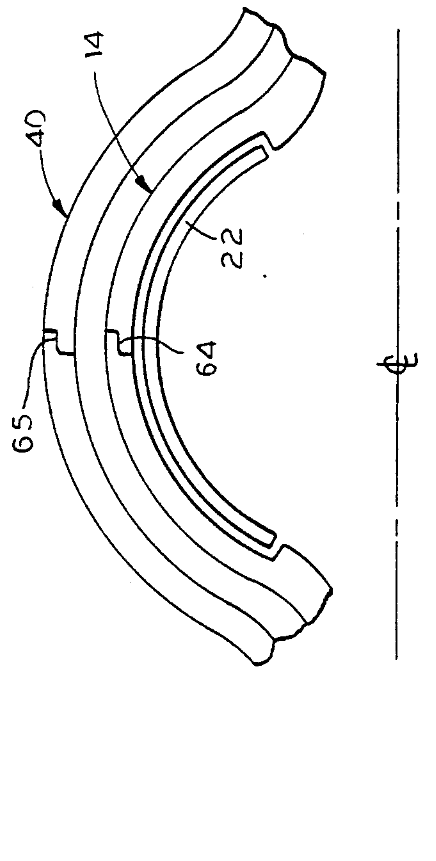
FIG. 7 is a cross sectional view illustrating a detail of construction of the hot gas generator.

As will be appreciated, the liners or shields 22 and 24 could be fabricated from three or more sections although a pair of sections has proven most economical. It will be appreciated that for assembly of the liners or shields 22 and 24 the interior wall 14 and exterior wall 40 must be made in separate halves joined as at 64 and 65, respectively (see FIG. 7) such that, after assembly of the liners or shields 22 and 24 inside the interior wall 14, the interior wall 14 is secured in a more or less airtight fashion as by welding and thereafter the halves of the exterior wall 40 are fastened together by appropriate gas tight means as well. In this connection, an advantage of the spherical shape of the interior wall 14, liners or shields 22 and 24, and exterior wall 40, is that complete symmetry is assured with reasonable accuracy without excessively expensive machining operations.

Of course, there is no inhibition to making the liners or shields 22 and 24 as a single complete assembly. It will be appreciated that this would prove a more desirable symmetry of holding of the liner when three radial supports are provided. Still additional variations of construction will suggest themselves to those skilled in the art.

Figure 8:
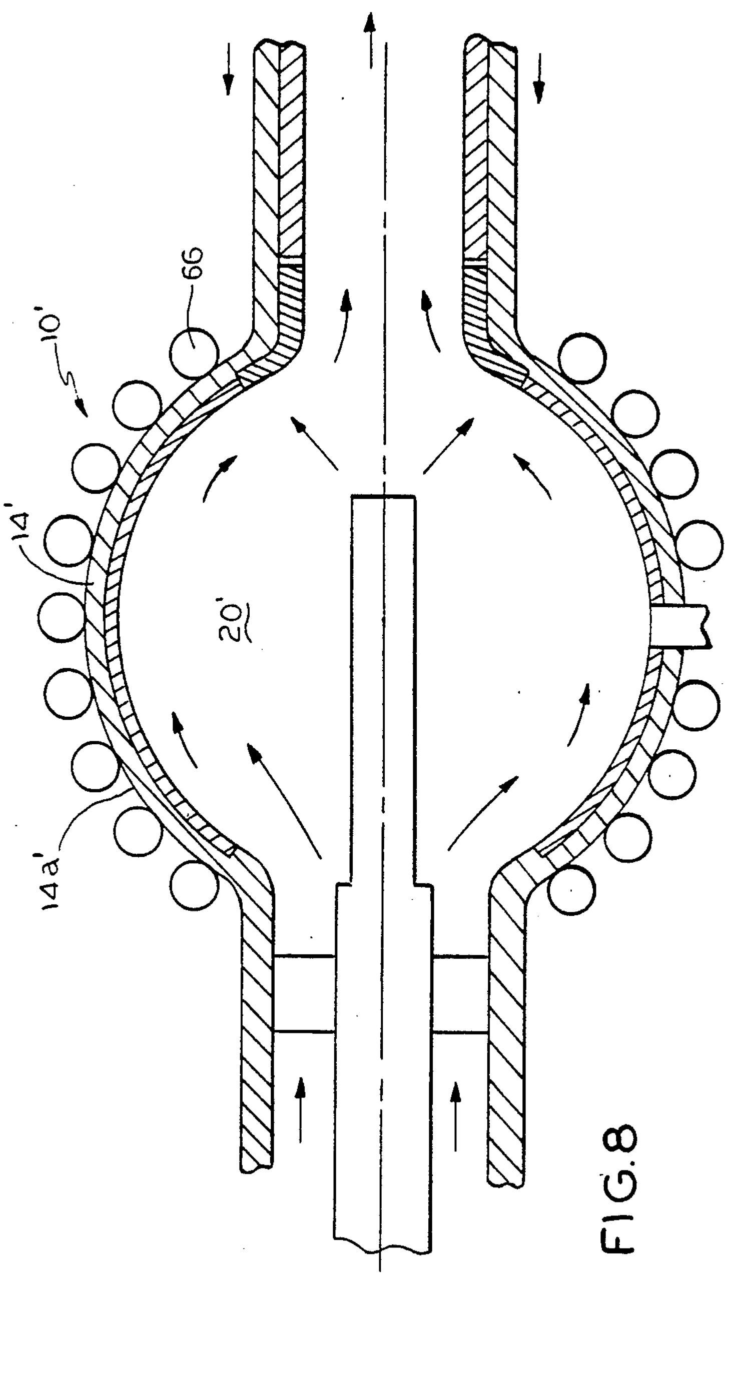
FIG. 8 is a partially schematic, partially sectional view of an alternative embodiment of hot gas generator in accordance with the present invention.

Referring to FIG. 8, an alternative embodiment of hot gas generator 10' has been illustrated wherein the principal difference relates to the fact that there is only a single wall 14' rather than an interior wall and an exterior wall. Cooling is accomplished by means of a fuel supply tube 64 fastened by means to assure good thermal contact, such as brazing, to the wall portion 14a' defining the combustion chamber 20' in typical coil fashion in this embodiment. With this arrangement, the brazed coil fuel supply tube 66 provides cooling to the wall portion 14a' in place of oxidant in the oxidant flow path 42 in the embodiment illustrated in FIG. 1.

An important design criteria for hot gas generators is that oxidant is typically stored at very high pressures, e.g., on the order of 4,750 PSI, which means that the oxidant temperature can, during expansion to a typical much lower combustion chamber pressure, e.g., on the order of the 300 PSI, become very cold. Certainly, in arctic conditions when the prevailing ambient can be −40° F. and less, the oxidant temperature, as delivered to the combustor, can fall to levels on the order of −200° F. This very cold oxidant can have a most deleterious effects on flame quench which have been overcome by the present invention. Furthermore, this super cold gas flowing over the fuel injector can readily chill and freeze the fuel which, initially at a prevailing ambient of −40° F. might freeze at a slightly lower temperature, e.g. on the order of minus −50° F. Similarly, the fine fuel droplets sprayed into this super cold might easily freeze to cause flameout and the evaporation and ignition of the fuel is much impeded at such super cold temperatures. Such problems are significantly reduced by the use of the generally spherically shaped liner in the manner taught herein since, once the liner is up to temperature, it is possible to extract a significant amount of heat from the flame without detriment to thereby raise the temperature of the cooling gas by several hundred degrees so as to minimize these problems of super cold gas.

With the present invention, the use of a generally spherical combustion chamber 20 minimizes surface area thereby minimizing heat flux to the walls 14 and 14' with the smooth shape also minimizing turbulence to further reduce heat flux. Another unique and significant advantage of the present invention is that by virtue of the laminarization effects of swirl flow the generally spherical shape of the combustion chamber 20 is able to further reduce heat flux to the walls 14 and 14'.

While in the foregoing there have been set forth preferred embodiments of the invention, it will be appreciated that the invention is only to be limited by the true spirit and scope of the appended claims.

We claim:

1. A hot gas generator, comprising:

a vessel having a wall defining narrow, spaced apart inlet and outlet ends interconnected by a relatively wide combustion chamber;

a liner positioned within said wall so as to be disposed substantially entirely about said combustion chamber, said liner being positioned relative to said wall to define means for controlling heat transfer from said combustion chamber through said liner and said wall, said heat transfer controlling means being adapted to limit stress on said liner through a preselected temperature range;

said heat transfer controlling means including a relatively uniform gap between said wall and said liner for controlling heat transfer from said combustion chamber through said liner and said wall entirely throughout said preselected temperature range, said liner being adapted to thermally expand under heat to close said gap at a preselected temperature with said gap being selected to accommodate thermal outward expansion of said liner in a manner producing relatively little stress thereon;

an oxidant inlet port at said inlet end of said wall; and a fuel discharge port for directing fuel into said combustion chamber.

2. The hot gas generator as defined in claim 1 wherein said liner is a generally spherically shaped liner formed of a material adapted to thermally expand under heat in a manner producing relatively little stress thereon.

3. The hot gas generator as defined in claim 1 wherein the portion of said wall defining said combustion chamber includes a recess, said recess being sized to loosely receive said liner so as to accommodate thermal outward expansion thereof.

4. The hot gas generator as defined in claim 1 further including surface means associated with at least one of said liner and said wall for controlling heat transfer from said combustion chamber through said liner and said wall entirely throughout said preselected temperature range.

5. The hot gas generator as defined in claim 1 including cooling means associated with said wall, said cooling means comprising a fuel supply tube on the side thereof opposite said combustion chamber, said fuel supply tube extending about and being joined to said wall in coil fashion.

6. A hot gas generator, comprising:

a vessel having a wall defining narrow, spaced apart inlet and outlet ends interconnected by a relatively wide, generally spherical combustion chamber;

a pair of hemispherically shaped liners positioned within said wall so as to be disposed about said combustion chamber, said hemispherically shaped liners being positioned relative to said wall to define a relatively uniform gap therebetween and being adapted to thermally expand under heat for controlling heat transfer from said combustion chamber through said liners and said wall entirely throughout a preselected temperature range, said gap being selected to accommodate thermal expansion of said hemispherically shaped liners so as to produce relatively little stress thereon;

said hemispherically shaped liners being adapted to thermally expand under heat to close said gap at a preselected temperature, said gap being selected to accommodate thermal radially outward expansion of said hemispherically shaped liners in a manner producing relatively little stress thereon;

an oxidant inlet port at said inlet end of said wall; and a fuel discharge port for directing fuel into said combustion chamber.

7. The hot gas generator as defined in claim 6 wherein the portion of said wall defining said combustion chamber includes a generally spherically shaped recess, said hemispherically shaped liners being sized relative to said generally spherically shaped recess in said wall to define said thermal expansion accommodating gap therebetween.

8. The hot gas generator as defined in claim 6 further including surface means associated with at least one of said hemispherically shaped liners and said wall for controlling heat transfer from said combustion chamber through said hemispherically shaped liners and said wall entirely throughout said preselected temperature range.

9. The hot gas generator as defined in claim 6 including cooling means associated with said wall, said cooling means comprising a fuel supply tube on the side thereof opposite said combustion chamber, said fuel supply tube extending about and being joined to said wall in coil fashion.

10. A hot gas generator, comprising:

a vessel having a wall defining narrow, spaced apart inlet and outlet ends interconnected by a relatively wide, generally spherical combustion chamber;

a pair of hemispherically shaped liners positioned within said wall so as to be disposed about said combustion chamber, said hemispherically shaped liners being positioned relative to said wall to define a relatively uniform gap therebetween and being adapted to thermally expand under heat to close said gap between said hemispherically shaped liners and said wall at a preselected temperature for controlling heat transfer from said combustion chamber through said liners and said wall entirely throughout a preselected temperature range in a manner producing relatively little stress thereon, and surface means associated with at least one of said hemispherically shaped liners and said wall for controlling heat transfer;

an oxidant inlet port at said inlet end of said wall; and a fuel discharge port for directing fuel into said combustion chamber.

11. The hot gas generator as defined in claim 10 wherein said hemispherically shaped liners are formed of a metal, said metal having a coating of a ceramic material defining an inner surface of said hemispherically shaped liners, said inner surface of said hemispherically shaped liners facing said combustion chamber.

12. The hot gas generator as defined in claim 11 wherein said hemispherically shaped liners are sufficiently thin-walled so as to be flexible, said thin-walled, flexible hemispherically shaped liners being rapidly heated and rapidly cooled during extreme heat transfer conditions.

13. The hot gas generator as defined in claim 10 wherein said vessel has a longitudinal axis extending from said inlet end through said combustion chamber to said outlet end thereof, said oxidant inlet port being disposed so as to be concentric with said longitudinal axis of said vessel at said inlet end of said interior wall.

14. The hot gas generator as defined in claim 10 wherein said vessel has a longitudinal axis extending from said inlet end through said combustion chamber to said outlet end thereof, said fuel discharge port being disposed so as to be concentric with said longitudinal axis of said vessel at said combustion chamber.

15. The hot gas generator as defined in claim 10 including a second fuel discharge port, one of said fuel discharge ports being disposed adjacent said inlet end and the other of said fuel discharge ports being disposed within said combustion chamber and upstream of said outlet end, said fuel discharge ports defining a dual fuel injector.

16. The hot gas generator as defined in claim 10 wherein the portion of said wall defining said combustion chamber includes a generally spherically shaped recess, said hemispherically shaped liners being sized relative to said generally spherically shaped recess in said wall to define said thermal expansion accommodating gap therebetween.

17. The hot gas generator as defined in claim 10 including cooling means associated with said wall, said cooling means comprising a fuel supply tube on the side thereof opposite said combustion chamber, said fuel supply tube extending about and being joined to said wall in coil fashion.

18. The hot gas generator as defined in claim 10 wherein said heat transfer controlling surface means includes a plurality of indentations in a surface of at least one of said hemispherically shaped liners and said wall for controlling heat transfer by impeding heat from said combustion chamber reaching said wall.

19. The hot gas generator as defined in claim 10 wherein said wall is an interior wall of said vessel, said vessel also including an exterior wall in closely spaced relation to said interior wall, said interior and exterior walls of said vessel together defining an oxidant flow path therebetween.

20. The hot gas generator as defined in claim 18 wherein said heat transfer controlling surface means includes a plurality of trip strips disposed in said oxidant flow path, said trip strips being secured to said interior wall of said vessel.

21. The hot gas generator as defined in claim 10 wherein said hemispherically shaped liners have a plurality of holes therein, said holes being disposed in a common plane generally perpendicular to a longitudinal axis of said vessel, and including an igniter disposed in one of said holes and a support pin disposed in the remainder of said holes.

* * * * *